Richard W. LaValley
Charles W. Kellogg, Jr.
INVENTORS

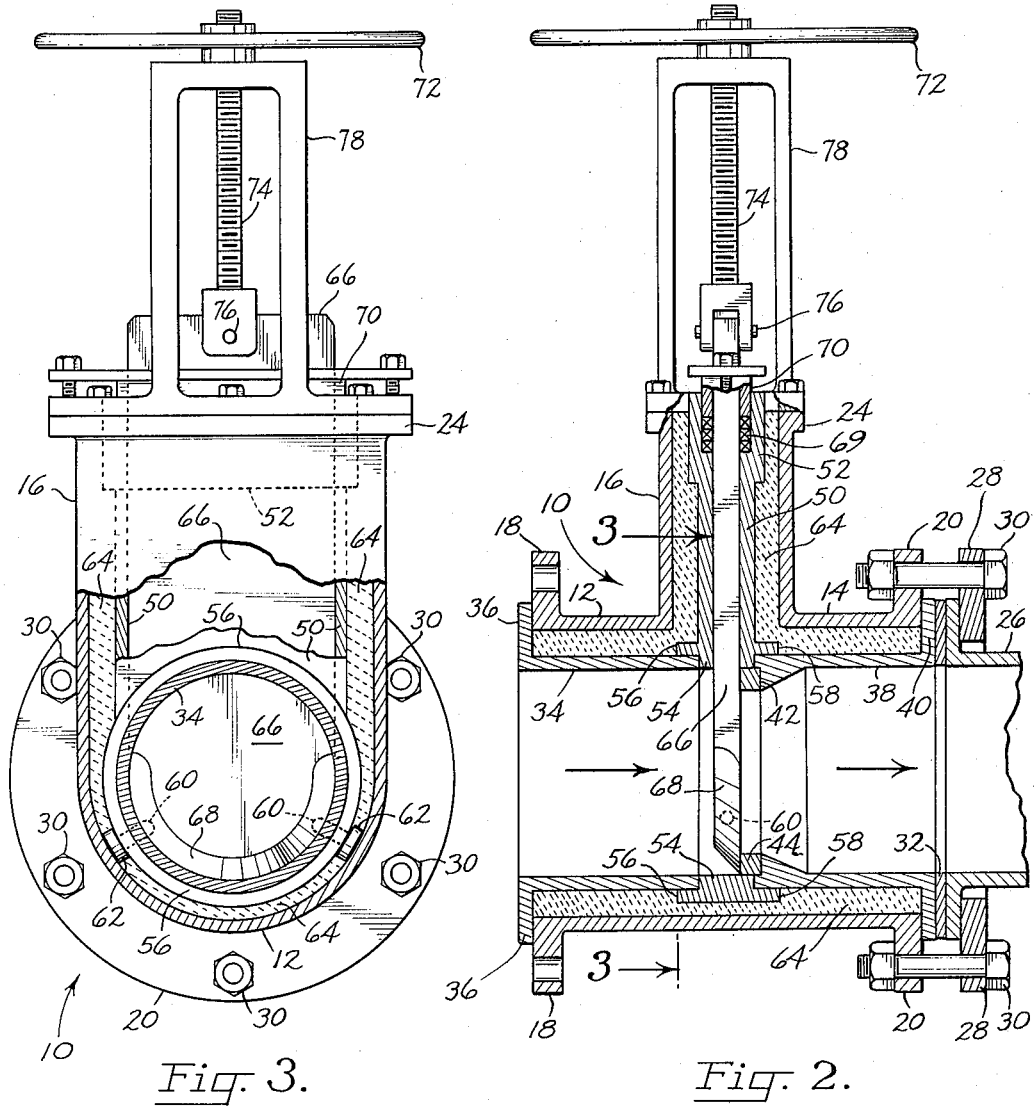

United States Patent Office 3,217,739
Patented Nov. 16, 1965

3,217,739
PLASTIC FILLED GATE VALVE
Richard W. La Valley, 1116 NE. 110th St., Vancouver, Wash., and Charles W. Kellogg, Jr., R.R. 1, Box 198, Orchards, Wash.
Filed Sept. 6, 1963, Ser. No. 307,171
2 Claims. (Cl. 137—375)

This invention relates to gate valves. It pertains particularly to gate valves applied to the control of corrosive fluids and comprising spaced body and liner sections, the space between the sections being filled with a plastic filler for economy of construction and efficiency in operation.

In papermills and other chemical plants where highly corrosive liquids are passed in large quantities through gate-valved conduits, it has been conventional practice to fabricate the valves entirely from corrosion resistant materials, such as stainless steel or titanium, or to fit an ordinary valve body with a carefully prepared, corrosion-resistant liner.

The first expedient involves exorbitant material costs because of the high price of corrosion resistant metals. The second expedient involves high labor costs because of the necessity of machining both the body and liner to the close tolerances required to fit the liner into the body, and to fit the gate into the liner.

Accordingly it is the general object of the present invention to provide a gate valve for use in handling corrosive fluids, which is easily fabricated, with minimum use of expensive materials and minimum labor costs, which accordingly is relatively inexpensive, and which provides efficient valving over a long service life, in diverse conduit systems, handling a wide variety of corrosive fluids.

The manner in which the foregoing and other objects of this invention are accomplished will be apparent from the accompanying specification and claims, considered together with the drawings, wherein:

FIG. 2 is a vertical longitudinal section of the presently described plastic-filled gate valve, with the parts in assembled relation; and FIG. 3 is a transverse sectional view, taken along line 3—3 of FIG. 2.

Figure 1:
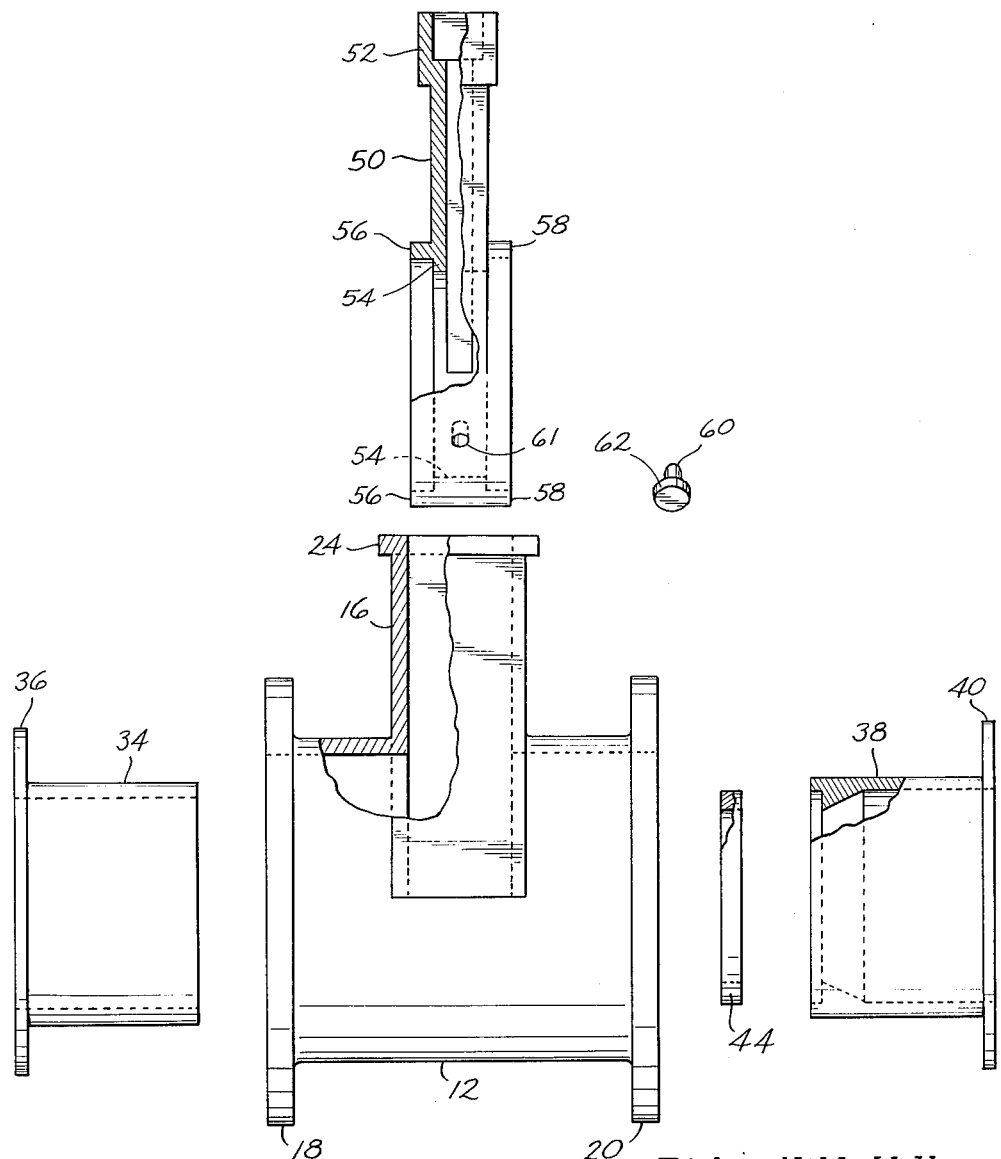
FIG. 1 is an exploded view of the herein described plastic-filled gate valve.

In its broadest aspect, the plastic filled gate valve of our invention comprises a hollow valve body having intersecting conduit and gate cavity sections adapted to be coupled between a pair of aligned, fluid carrying conduits. A hollow liner having intersecting conduit and gate cavity sections is inserted within the hollow valve body. The liner is aligned with, but spaced from, the inner side walls of the valve body.

A pourable plastic material which may comprise, for example, a thermosetting synthetic resin, then is poured in the space between the liner and body and allowed to set. Appropriate gate means then is introduced into the gate cavity section of the liner, in operative position for controlling the flow of fluid through the conduit sections thereof.

By this construction it is possible to provide the major proportion of the valve, weightwise considered, of a relatively inexpensive casting which need not even be machined. Only the liner need be provided of relatively costly, corrosion resistant material, machined to the tolerances required for operation of the gate. In this manner, the cost of the valve may be kept at a minimum without sacrifice of operating efficiency.

Considering the foregoing in greater detail and with particular reference to the drawings:

As is apparent particularly in FIG. 2, the presently described plastic-filled gate valve includes a body, indicated generally at 10, and made up of two principal sections, i.e. of intersecting upstream and downstream liner conduit housing sections 12, 14 and a liner gate cavity housing section 16.

The liner conduit housing sections are provided with coupling flanges 18, 20, respectively, while the liner gate cavity housing section is provided with another coupling flange 24. Accordingly it is possible to fasten both ends of the valve to aligned flanged conduits, one of which is indicated at 26, by means of a coupling ring 28 and bolts 30. A suitable gasket 32 is interposed between the valve and the conduit.

The body 10 of the valve, which may be of substantial size, may be fabricated from inexpensive metal in the form of a rough casting. It need not be machined to accommodate either the gate or a liner, thus materially reducing the cost of the final valve.

Suitable liner means are provided within the body, a spaced distance therefrom. The liner means may be fabricated from a selected corrosion resistant material used in minimum amount. It need be machined only as required for operation of the gate and for coupling of the valve.

The liner broadly comprises intersecting liner conduit and gate cavity sections dimensioned for insertion in the corresponding sections of the valve body, aligned therewith, but spaced therefrom.

The liner preferably is formed in three separate portions capable of being joined as an integral unit. These are upstream and downstream conduit sections, and an intermediate gate cavity section which serves to contain and guide the gate. All may be fabricated from corrosion-resistant metal or plastic.

The upstream liner conduit section is indicated at 34. It comprises a stub conduit having a diameter somewhat less than the diameter of the conduit housing section 12 of the body. It is provided with a flange 36 which overlies in sealing relation a flange 18 of the body.

Downstream liner conduit section 38 likewise comprises a short section of corrosion resistant material of somewhat smaller diameter than the diameter of conduit housing section 14 of the valve body. Its outer end is provided with a flange 40 through which the valve may be coupled in sealed relation to flanged conduit 26.

The inner end of downstream liner conduit section 38 has a thickened side wall in the end surface of which is milled an annular recess 42. This is dimensioned to receive a sealing ring 44, against which bears a gate member to be described later.

The liner gate cavity or gate guiding section 50 is arranged at substantially right angles to liner conduit sections 34, 38. Its inner surface is machined to receive the gate. Its upper end is provided with a packing cavity 52.

Liner gate cavity 50 is provided with an extension 54 which extends across the liner conduit sections and which serves as a connecting conduit segment therefor. The inner ends of the liner conduit sections abut the ends of extension 54.

Coupling means are provided on the liner gate cavity section for coupling together the three elements of the liner assembly. In the illustrated form of the invention the coupling means comprise outwardly directed, opposite flanges 56, 58 which receive and overlie, respectively, the inner ends of liner conduit sections 34, 38.

If desired, means also may be provided for guiding the lower beveled end of the gate into tightly sealing engagement with the sealing ring 44.

Such means are shown particularly in FIG. 3. They comprise a plurality of radially spaced contact posts 60, each penetrating a corresponding opening 61 (FIG. 1) through the lower arc of liner extension 54 and provided with a base 62 which bears against the inner side wall of the conduit housing section of the body. When the valve gate is closed, the posts wedge it against sealing ring 44, tightly sealing off the valve opening.

The space between the valve body and the various assembled elements of the valve liner is filled with a suitable filler material, indicated at 64. As explained above, the presence of this material eliminates the necessity of machining the inside surface of the body and the outside surface of the liner to the close tolerances required, for example, if the liner were to be fused or otherwise affixed directly to the body.

A diversity of filler materials may be employed, including various of the thermosetting resins. These may be poured into the space between the body and liner in an uncured condition. Thereafter they may be heated and cured to a solid rigid state.

Similarly, various thermoplastic resins may be used. These are poured into the space between the body and the liner while molten and fluid. Thereafter they are cooled to hard and rigid condition.

Still further, an inorganic cementitius material may be employed. This may be poured into the recess and allowed to set. Like the other classes of pourable, settable filler materials which may be employed, it unites the body and liner into a single, unified valve structure.

Thus, examples of filler materials suitable for use in the present invention are the polyester resins, the epoxy resins, the polytetrafluoroethylene resins, Portland cement, and plaster of Paris.

The gate means employed in the presently described valve comprises a gate 66 having a beveled inner end 68. It works in and is guided by liner gate cavity 50 and its extension 54. Its outer end is sealed by packing 69 and packing gland 70.

Various actuating means may be employed for moving the gate between open and closed positions. In the form of the invention illustrated in the drawings, such means comprise a hand wheel 72 fixed to a screw 74 which is connected to the outer end of the gate by a pin 76. Screw 74 is threaded into a yoke 78, the flanged ends of which are bolted to flanges 24 on the outer end of body gate cavity section 16.

To assemble the plastic filled gate valve of our invention, liner member 50, with posts 60 inserted in the extension 54 thereof, is inserted through body gate cavity 16 until extension 54 lies completely across the valve opening. Liner conduit sections 34, 40 then are inserted into the conduit housing portions 12, 14 of the body, whereupon their inner ends are received by annular flanges 56, 58.

Since the top of the valve is open, a pourable filler material may be poured into the opening, whereupon it circulates to all portions of the recess between the spaced liner and valve body. Upon setting, the filler unites the body and liner into a unified structure into which sealing ring 44 and gate 66 sequentially may be introduced. Screw 74 is coupled to the outer end of the gate and yoke 78 bolted to the upper end of the valve body.

In this manner all of the various components of the valve are oriented in working relation to provide a valve of relatively low cost and high operating efficiency. Also, since sealing ring 44 is releasably positioned, it may be removed and replaced from time to time as required, upon first removing the gate. This prolongs materially the useful life of the valve.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:
1. A gate valve for use in controlling the flow of fluid through a pair of aligned conduits, the gate valve comprising:
  (a) a hollow valve body having aligned upstream and downstream line conduit housing sections and an intersecting line gate cavity housing section,
  (b) outwardly flanged coupling means on the ends of the body conduit housing sections for coupling them to conduits,
  (c) hollow liner means having aligned upstream and downstream conduit sections and an intersecting gate cavity section, the line means being positioned within the hollow valve body,
  (d) with the conduit and gate cavity sections of the liner means aligned with, but spaced inwardly from the conduit and gate cavity housing sections of the valve body,
  (e) plastic filler material in the space between the body and liner, the filler material being characterized by being initially pourable into said space and thereafter hardened,
  (f) the liner comprising three separate sections including upstream and downstream liner conduit sections and an intermediate liner gate cavity section,
  (g) the liner gate cavity section extending across the inner ends of the liner conduit sections,
  (h) liner coupling means comprising aligned annular flanges extending outwardly on both sides of the liner gate cavity section and receiving in sealing relation the inner ends of the liner conduit sections,
  (i) the liner conduit sections being provided at their outer ends with outwardly projecting flanges abutting in sealing relation the flanges of the coupling means on the outer ends of the body conduit housing sections,
  (j) the inner end of the downstream liner conduit section being provided with an annular recess opening into said conduit section,
  (k) sealing ring means seated in the annular recess, and
  (l) gate means working in the liner gate cavity section and bearing against the sealing ring means.

2. A gate valve for use in controlling the flow of fluids through a pair of aligned conduits the gate valve comprising:
  (a) a hollow valve body having aligned upstream and and downstream liner conduit housing sections and an intersecting liner gate cavity housing section,
  (b) coupling means on the ends of the body conduit housing sections for coupling them to upstream and downstream conduits,
  (c) hollow liner means positioned within the hollow valve body and comprising three separate sections including upstream and downstream conduit sections and an intermediate gate cavity section extending across the ends of the conduit sections,
  (d) and coupling means comprising annular flanges extending outwardly on both sides of the gate cavity section, the annular flanges receiving therein the inner ends of the liner conduit sections,
  (e) the inner end of the downstream liner conduit section having an annular recess opening into said conduit section and including a sealing ring seated in the recess, bearing against the gate means in sealing relation when the gate means is closed,
  (f) the conduit and gate cavity sections of the liner being aligned with but spaced inwardly from the conduit and gate cavity housing sections of the body,
  (g) a filler material in the space between the body and the liner, the filler material being characterized by being initially pourable into said space and thereafter hardened, and (h) gate means working in the liner and operative to control the flow of fluid through the conduit sections thereof.

References Cited by the Examiner

UNITED STATES PATENTS

| | | | |
|---|---|---|---|
| 2,133,742 | 10/1938 | Forbes | 251—366 |
| 2,352,799 | 7/1944 | Newton | 137—375 |
| 2,664,098 | 12/1953 | McInerney | 137—340 |
| 2,792,845 | 5/1957 | Atherton et al. | 137—375 |
| 2,824,715 | 2/1958 | Williams | 251—329 |

FOREIGN PATENTS 1,044,271   6/1953   France.

M. CARY NELSON, *Primary Examiner.*

HENRY T. KLINKSIEK, *Examiner.*